(12) United States Patent
Nakamura

(10) Patent No.: US 10,261,881 B2
(45) Date of Patent: Apr. 16, 2019

(54) INFORMATION PROCESSING APPARATUS, INFORMATION PROCESSING SYSTEM, INFORMATION PROCESSING METHOD, COMPUTER PROGRAM, AND STORAGE MEDIUM

(71) Applicant: Yutaka Nakamura, Kanagawa (JP)

(72) Inventor: Yutaka Nakamura, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/543,054

(22) PCT Filed: Jan. 14, 2016

(86) PCT No.: PCT/JP2016/000166
§ 371 (c)(1),
(2) Date: Jul. 12, 2017

(87) PCT Pub. No.: WO2016/114140
PCT Pub. Date: Jul. 21, 2016

(65) Prior Publication Data
US 2018/0011773 A1 Jan. 11, 2018

(30) Foreign Application Priority Data

Jan. 14, 2015 (JP) .................................. 2015-005380
Nov. 6, 2015 (JP) .................................. 2015-218566

(51) Int. Cl.
*G06F 11/30* (2006.01)
*G06F 13/38* (2006.01)
(Continued)

(52) U.S. Cl.
CPC ........... *G06F 11/3051* (2013.01); *B41J 29/38* (2013.01); *G06F 3/023* (2013.01); *G06F 3/038* (2013.01);
(Continued)

(58) Field of Classification Search
CPC .............. G06F 13/385; G06F 13/4068; G06F 11/3051; G06F 9/4411
See application file for complete search history.

(56) References Cited

U.S. PATENT DOCUMENTS 8,806,072 B2 * 8/2014 Uehara ................. G06F 9/4413
710/8
9,304,717 B2 * 4/2016 Yasui .................... G06F 3/1204
(Continued)

FOREIGN PATENT DOCUMENTS

JP 2010-039616 2/2010
JP 2011-104843 6/2011
(Continued)

OTHER PUBLICATIONS

International Search Report dated Mar. 22, 2016 in PCT/JP2016/00166 filed on Jan. 14, 2016.
(Continued)

*Primary Examiner* — Brian T Misiura
(74) *Attorney, Agent, or Firm* — Oblon, McClelland, Maier & Neustadt, L.L.P.

(57) ABSTRACT

An information processing apparatus includes: an operating unit capable of recognizing a peripheral apparatus. The operating unit includes: a first recognizing unit configured to recognize, when a peripheral apparatus is connected to the operating unit and identification information about the connected peripheral apparatus is included in peripheral apparatus information including predetermined identification information, the connected peripheral apparatus as a first peripheral apparatus; and a second recognizing unit configured to recognize, when a peripheral apparatus is connected to the operating unit and the identification information about the connected peripheral apparatus is not included in the
(Continued)

peripheral apparatus information, the connected peripheral apparatus as a second peripheral apparatus.

10 Claims, 8 Drawing Sheets

(51) Int. Cl.
    *G06F 11/32*     (2006.01)
    *G06F 13/42*     (2006.01)
    *G06F 9/4401*     (2018.01)
    *B41J 29/38*     (2006.01)
    *H04N 1/00*     (2006.01)
    *G06F 3/023*     (2006.01)
    *G06F 3/038*     (2013.01)
    *G06F 3/12*     (2006.01)

(52) U.S. Cl.
    CPC .......... *G06F 3/1204* (2013.01); *G06F 3/1236* (2013.01); *G06F 3/1284* (2013.01); *G06F 9/4413* (2013.01); *G06F 9/4415* (2013.01); *G06F 11/3013* (2013.01); *G06F 11/327* (2013.01); *G06F 13/385* (2013.01); *G06F 13/4282* (2013.01); *H04N 1/00* (2013.01)

(56) References Cited

U.S. PATENT DOCUMENTS

| | | | |
|---|---|---|---|
| 9,547,504 B2* | 1/2017 | Bin | ........................ G06F 9/4418 |
| 2004/0260845 A1* | 12/2004 | Inokuchi | .................. G06F 8/65 |
| | | | 710/8 |
| 2010/0178066 A1 | 7/2010 | Asahara | |
| 2010/0199290 A1* | 8/2010 | Kavanaugh | ........ H04N 1/00204 |
| | | | 719/327 |
| 2011/0241981 A1 | 10/2011 | Sojian | |
| 2012/0226828 A1 | 9/2012 | Uehara | |

FOREIGN PATENT DOCUMENTS

| | | |
|---|---|---|
| JP | 2014-120057 | 6/2014 |
| WO | WO 01/97025 A1 | 12/2001 |

OTHER PUBLICATIONS

International Preliminary Report on Patent Ability dated Jul. 19, 2016 in PCT/JP2016/060166 filed on Jan. 14, 2016.
Extended European Search Report dated Dec. 6, 2017 in Patent Application No. 16737211.9.

* cited by examiner

[Fig. 1]
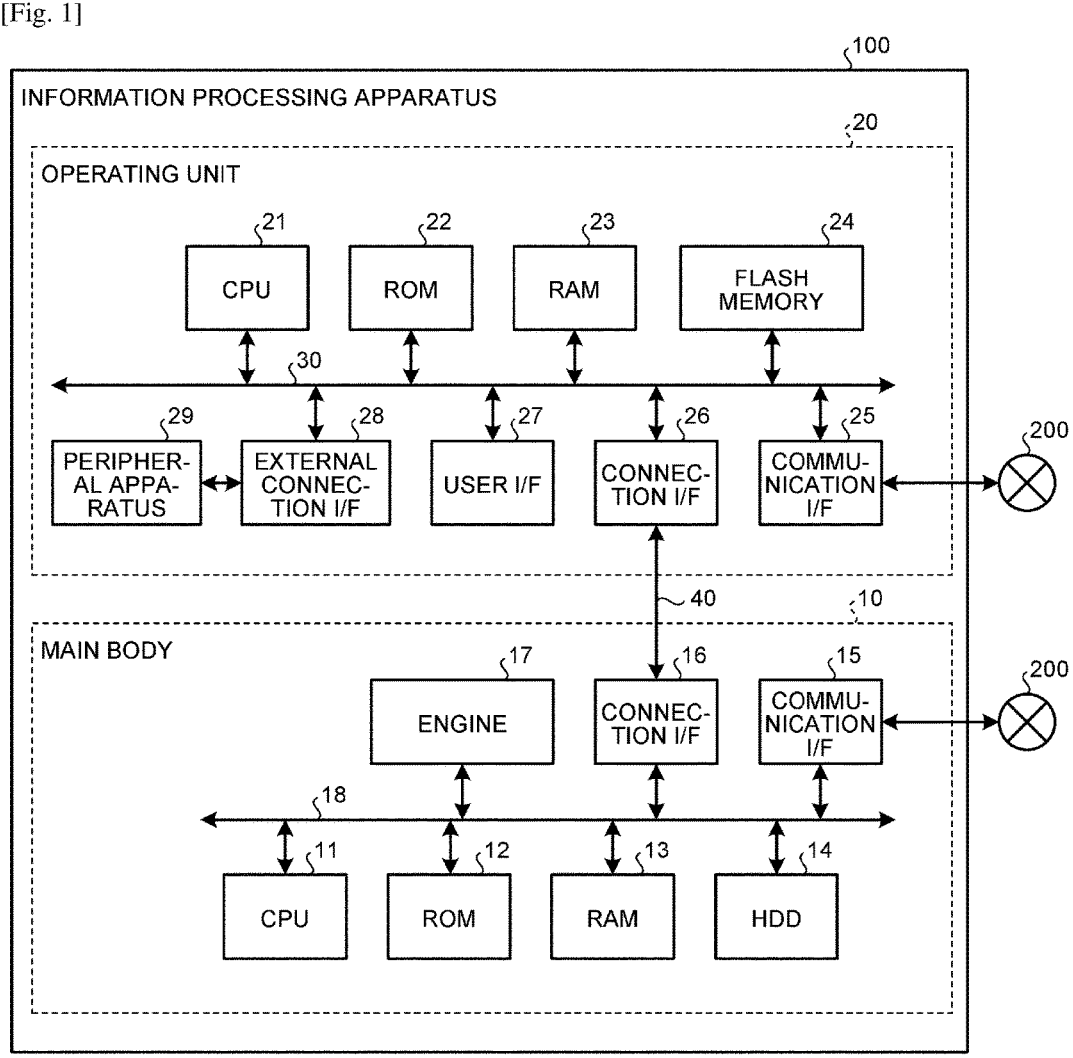

[Fig. 2]
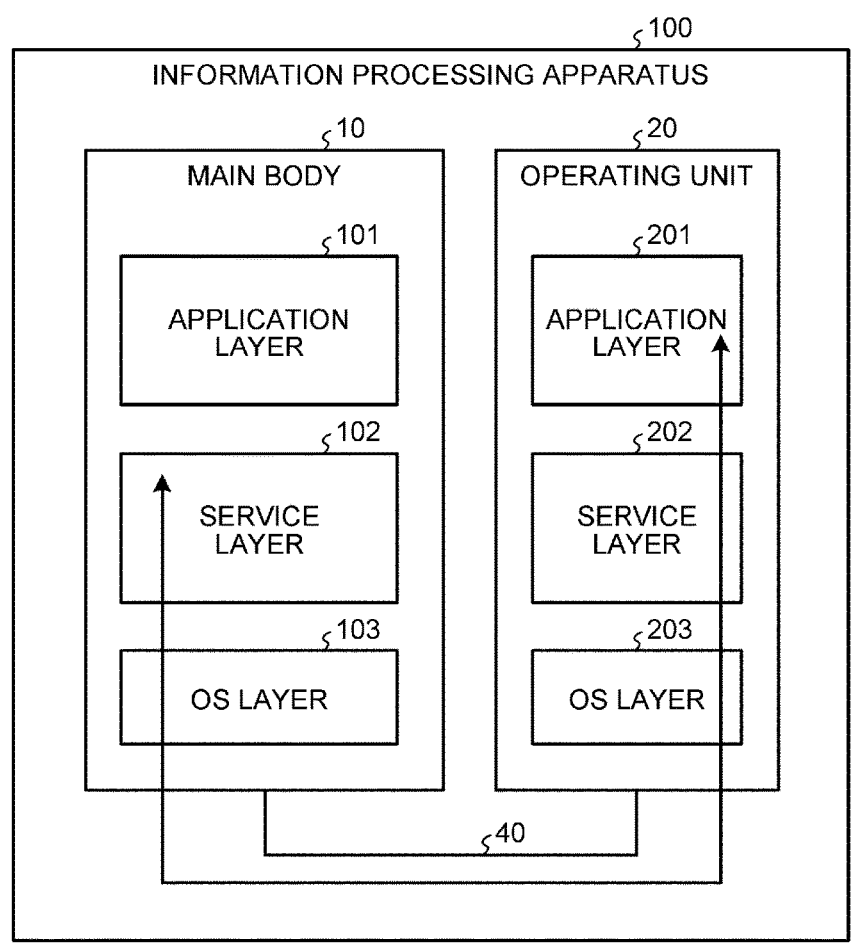

[Fig. 3]
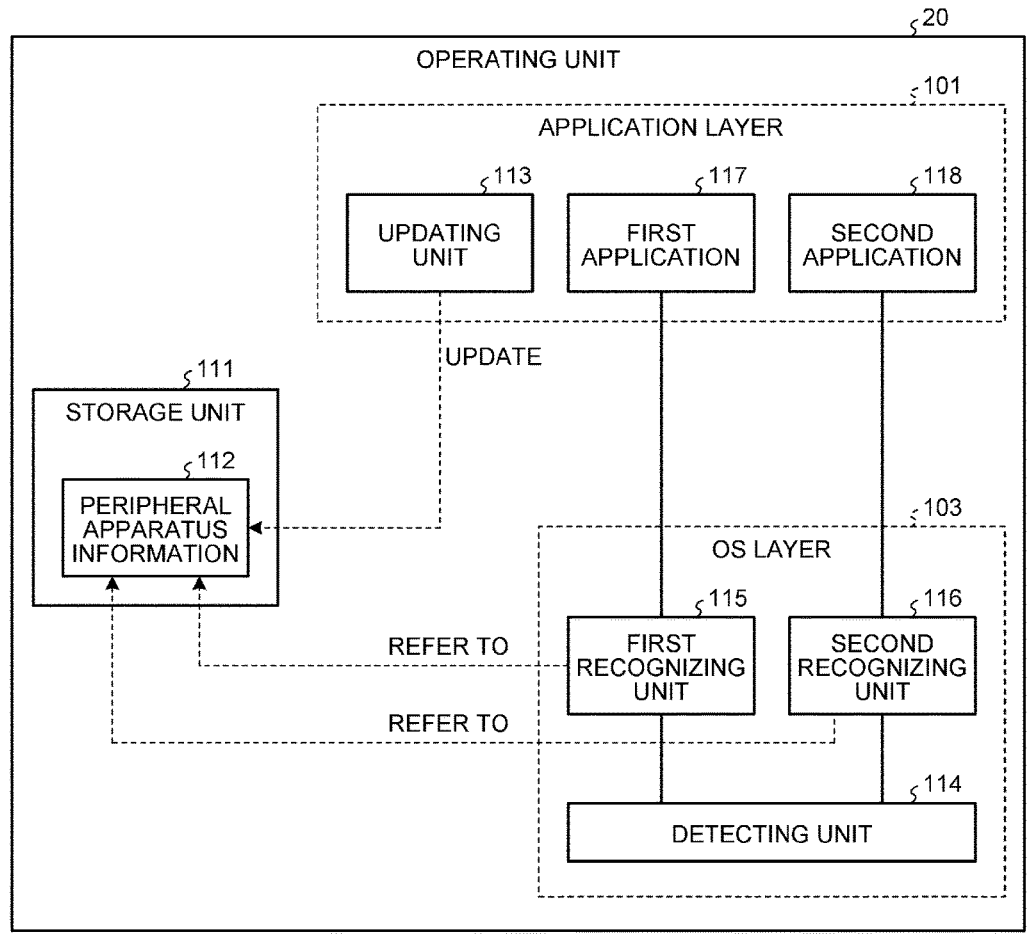
[Fig. 4]
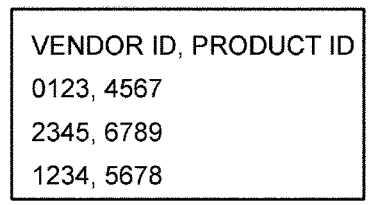
[Fig. 5]
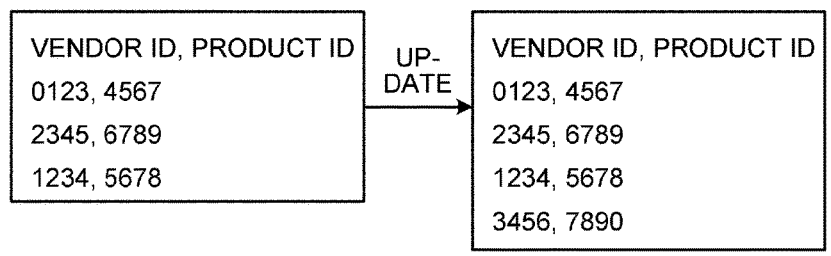

[Fig. 6]
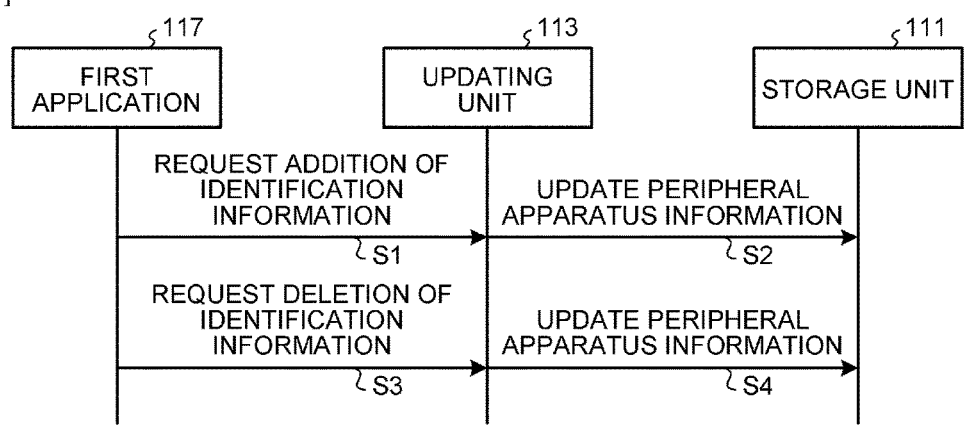

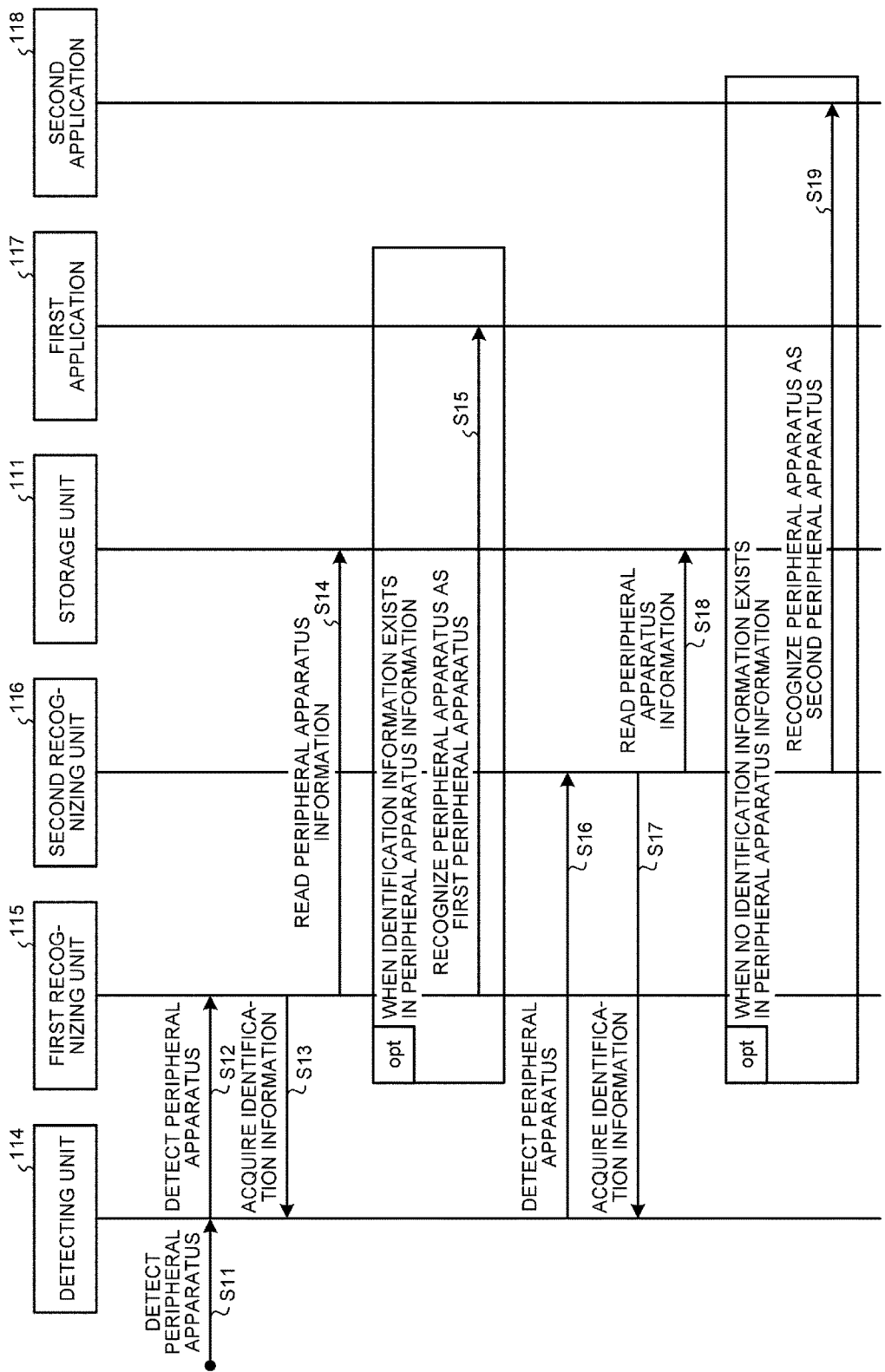

[Fig. 8]
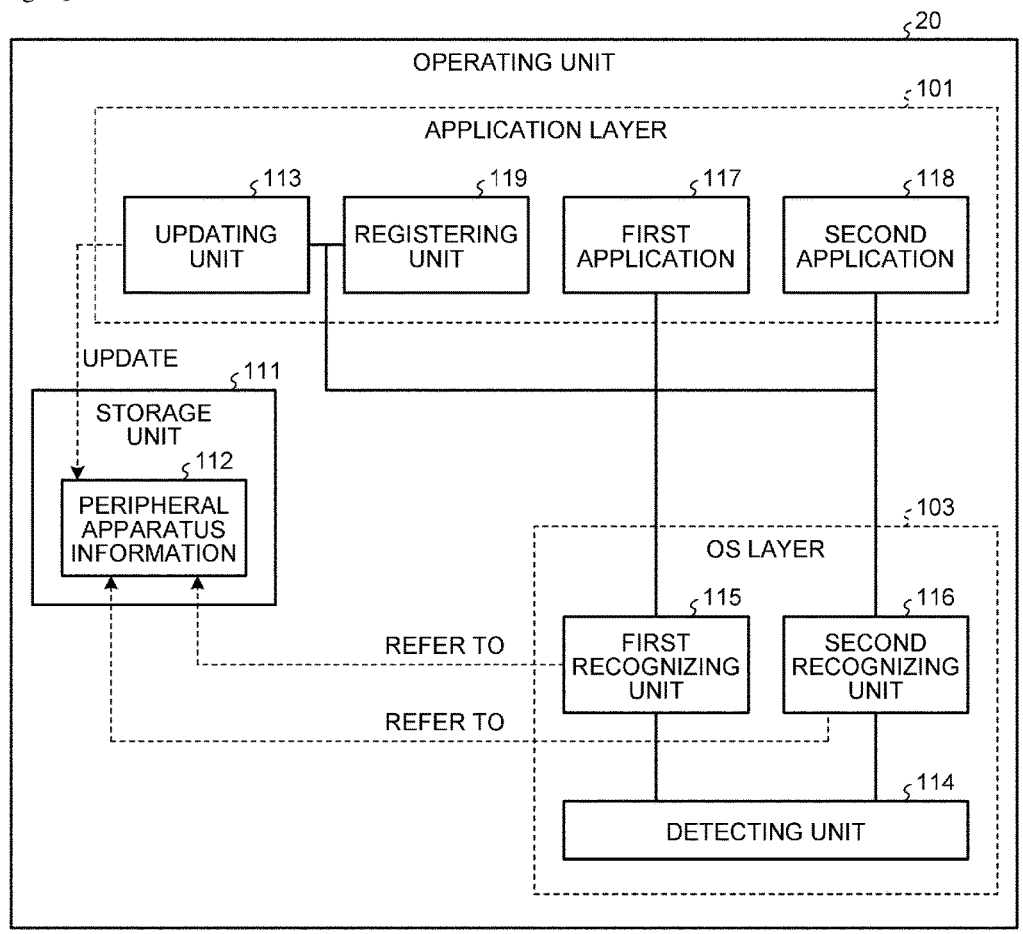

[Fig. 9]
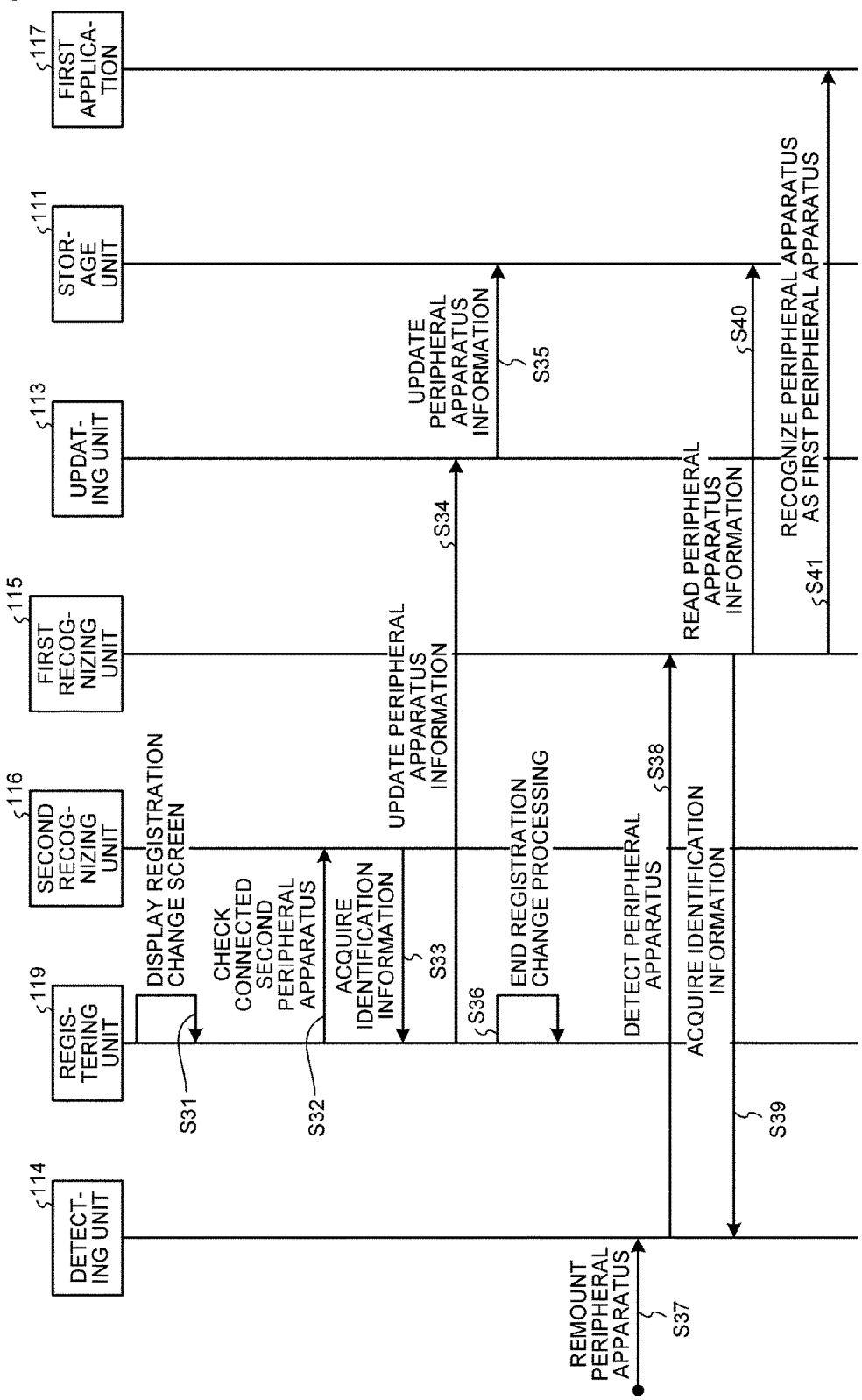

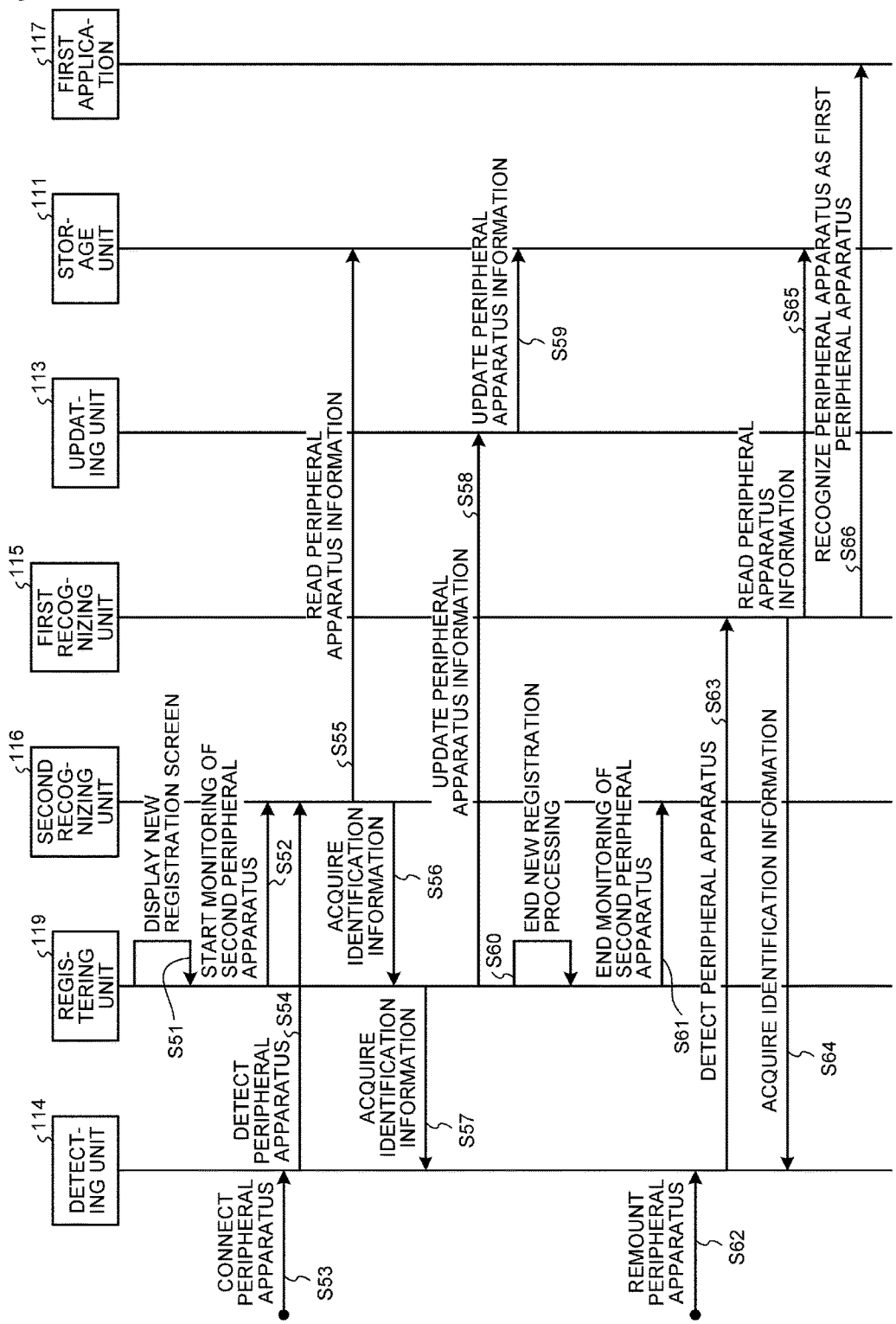

INFORMATION PROCESSING APPARATUS, INFORMATION PROCESSING SYSTEM, INFORMATION PROCESSING METHOD, COMPUTER PROGRAM, AND STORAGE MEDIUM

TECHNICAL FIELD

The present invention relates to an information processing apparatus, an information processing system, an information processing method, a computer program, and a storage medium.

BACKGROUND ART

Conventionally, there has been known a technology for reading, when a user uses an information processing apparatus such as a multifunction peripheral (MFP), information on an integrated circuit (IC) card by use of an IC card reader of the information processing apparatus so as to perform user authentication and the like. An IC card reader is recognized by an information processing apparatus based on a certain connection standard. For example, a device class of an IC card reader conforming to a universal serial bus (USB) connection standard is a human interface device (HID), and a protocol thereof is Keyboard. For that reason, an IC card reader conforming to a USB connection standard is recognized as the same peripheral apparatus as a keyboard conforming to a USB connection standard on an information processing apparatus.

Patent Literature 1 discloses the invention of an image forming apparatus, a method and an information processing program that flexibly determines, when a USB device is connected to an MFP, whether the connected USB device can be used.

SUMMARY OF INVENTION

Technical Problem

However, the conventional technology has a problem that, when an IC card is held over an IC card reader of an information processing apparatus, information on the IC card is treated as key input of a keyboard and the information on the IC card is displayed in a text box or the like on an operation panel. Specifically, for example, in the case of an IC card reader conforming to a USB connection standard, a problem that, if an IC card is held in a state where an application for authenticating a user does not start, information on the IC card may be treated as key input of a keyboard depending on an operating system (OS) of an information processing apparatus and the information on the IC card is displayed in a text box or the like on an operation panel may occur.

In view of the foregoing, there is a need to provide an information processing apparatus, an information processing system, an information processing method, a computer program, and a storage medium that enables a kind of a peripheral apparatus connected to the information processing apparatus, to be more appropriately recognized.

Solution to Problem

An information processing apparatus includes: an operating unit capable of recognizing a peripheral apparatus. The operating unit includes: a first recognizing unit configured to recognize, when a peripheral apparatus is connected to the operating unit and identification information about the connected peripheral apparatus is included in peripheral apparatus information including predetermined identification information, the connected peripheral apparatus as a first peripheral apparatus; and a second recognizing unit configured to recognize, when a peripheral apparatus is connected to the operating unit and the identification information about the connected peripheral apparatus is not included in the peripheral apparatus information, the connected peripheral apparatus as a second peripheral apparatus.

Advantageous Effects of Invention

According to the present invention, a kind of a peripheral apparatus connected to an information processing apparatus can be more appropriately recognized.

BRIEF DESCRIPTION OF DRAWINGS

FIG. 1 is a diagram illustrating an example of a hardware configuration of an information processing apparatus according to a first embodiment.

FIG. 2 is a diagram illustrating an example of a software configuration of the information processing apparatus according to the first embodiment.

FIG. 3 is a diagram illustrating an example of a functional block configuration of an operating unit according to the first embodiment relating to recognition of a peripheral apparatus.

FIG. 4 is a diagram illustrating an example of peripheral apparatus information according to the first embodiment.

FIG. 5 is a diagram illustrating an example of updating the peripheral apparatus information according to the first embodiment.

FIG. 6 is a sequence diagram illustrating an example of a method for updating the peripheral apparatus information according to the first embodiment.

FIG. 7 is a sequence diagram illustrating an example of a method for recognizing the peripheral apparatus according to the first embodiment.

FIG. 8 is a diagram illustrating an example of a functional block configuration of the operating unit according to a second embodiment relating to recognition of the peripheral apparatus.

FIG. 9 is a sequence diagram illustrating an example of a method for changing registration of the peripheral apparatus according to the second embodiment.

FIG. 10 is a sequence diagram illustrating an example of a method for newly registering the peripheral apparatus according to the second embodiment.

DESCRIPTION OF EMBODIMENTS

Exemplary embodiments of an information processing apparatus, an information processing system, an information processing method, a computer program, and a storage medium are described in detail below with reference to the accompanying drawings.

First Embodiment

FIG. 1 is a diagram illustrating an example of a hardware configuration of an information processing apparatus 100 according to a first embodiment. The information processing apparatus 100 according to the first embodiment includes a main body 10 and an operating unit 20. The main body 10 implements various kinds of functions such as a copy function, a scanner function, a facsimile function, and a printer function. The operating unit 20 may be a single apparatus that receives information corresponding to operations made by a user, and may be a multifunction peripheral (MFP) that has a plurality of functions out of the functions. Examples of the information corresponding to operations made by a user include a signal indicating a coordinate value on a screen that specifies a selected item. The example of FIG. 1 illustrates an example of a case where the information processing apparatus 100 is an MFP, but this is one example. The present invention may be applied to information processing apparatuses other than an MFP such as a projector, a video conference system, and a digital camera.

The main body 10 and the operating unit 20 are communicably connected to one another through a connection interface (I/F) 16, a communication path 40, and a connection I/F 26. For example, a communication path conforming to a universal serial bus (USB) connection standard can be used as the communication path 40, but, regardless of wired or wireless, a communication path conforming to any standard may be used.

The main body 10 operates according to operations received by the operating unit 20. The main body 10 can communicate with external apparatuses such as a personal computer (PC), and can operate according to instructions (print instruction and the like) received from the external apparatuses.

The following describes a hardware configuration of the main body 10. The main body 10 according to the first embodiment includes a central processing unit (CPU) 11, a read only memory (ROM) 12, a random access memory (RAM) 13, a hard disk drive (HDD) 14, a communication I/F 15, the connection I/F 16, and an engine 17. The CPU 11, the ROM 12, the RAM 13, the HDD 14, the communication I/F 15, the connection I/F 16, and the engine 17 are connected to one another through a system bus 18.

The CPU 11 integrally controls the operation of the main body 10. The CPU 11 executes a computer program stored in the ROM 12, the HDD 14, or the like using the RAM 13 as a work area (task area) so as to control the operation of the whole main body 10 and implement various kinds of functions such as the copy function, the scanner function, the facsimile function, and the printer function.

The communication I/F 15 is an interface for connecting to a network 200. The connection I/F 16 is an interface for communicating with the operating unit 20 through the communication path 40.

The engine 17 is hardware that performs processing other than general-purpose information processing and communication, for implementing the copy function, the scanner function, the facsimile function, and the printer function. The engine 17 includes, for example, a scanner that scans and reads an image of a document, a plotter that performs printing on a sheet member such as sheets of paper, and a facsimile that performs facsimile communication. The engine 17 may also include hardware for implementing a specific option such as a finisher that sorts a printed sheet member and an auto document feeder (ADF) that automatically feeds a document.

The following describes a hardware configuration of the operating unit 20. The operating unit 20 according to the first embodiment includes a CPU 21, a ROM 22, a RAM 23, a flash memory 24, a communication I/F 25, a connection I/F 26, a user I/F 27, an external connection I/F 28, and a peripheral apparatus 29. The CPU 21, the ROM 22, the RAM 23, the flash memory 24, the communication I/F 25, the connection I/F 26, the user I/F 27, and the external connection I/F 28 are connected to one another through a system bus 30. The peripheral apparatus 29 is connected to the external connection I/F 28.

The CPU 21 integrally controls the operation of the operating unit 20. The CPU 21 executes a computer program stored in the ROM 22, the flash memory 24, or the like using the RAM 23 as a work area (task area) so as to control the operation of the whole operating unit 20 and implement display of information (image) corresponding to input received from a user, and/or the like.

The communication I/F 25 is an interface for connecting to the network 200. The connection I/F 26 is an interface for communicating with the main body 10 through the communication path 40.

The user I/F 27 is an operation panel and an input apparatus. The operation panel receives various kinds of input corresponding to operations made by a user, and displays various kinds of information (for example, information corresponding to received operations, information indicating an operation situation of the information processing apparatus 100, and information indicating a setting state and the like of the information processing apparatus 100). The operation panel is formed of a liquid crystal display (LCD) apparatus with a touch panel function, but is not limited to the liquid crystal display. The operation panel may be formed of, for example, an organic electroluminescence (EL) display apparatus with a touch panel function. The input apparatus is hardware keys (buttons). The user I/F 27 may further include a display unit such as a lamp.

The external connection I/F 28 is an interface for connecting to the peripheral apparatus 29. The external connection I/F 28 is, for example, a USB port. The first embodiment describes a case where the external connection I/F 28 is a USB port as an example. Examples of the peripheral apparatus 29 include human interface devices (HIDs) such as an information reading device, a keyboard, a mouse, and a joystick. Examples of the information reading device include an IC card reader using a communication standard such as near field communication (NFC).

Hardware of the main body 10 and the operating unit 20 may be formed of a single housing, and may be formed by separating the operating unit 20 from the main body 10. For example, the main body 10 may be an electronic apparatus such as an MFP and the operating unit 20 may be an information processing apparatus such as a touch panel, a tablet, or the like removable from the electronic apparatus.

The following describes a software configuration of the information processing apparatus 100 according to the first embodiment.

FIG. 2 is a diagram illustrating an example of a software configuration of the information processing apparatus 100 according to the first embodiment. The main body 10 according to the first embodiment includes an application layer 101, a service layer 102, and an operating system (OS) layer 103. Software of the application layer 101, the service layer 102, and the OS layer 103 is stored in the ROM 12, the HDD 14, and/or the like (see FIG. 1). The CPU 11 executes the software so as to provide various kinds of functions.

Software of the application layer 101 is application software (hereinafter may be simply referred to as an "application") for operating a hardware resource and providing a certain function. Examples of the application include a copy application for providing a copy function, a scanner application for providing a scanner function, a facsimile application for providing a facsimile function, and a printer application for providing a printer function.

Software of the service layer 102 is interposed between the application layer 101 and the OS layer 103, and is software for providing an interface for using hardware resources included in the main body 10 to the application. More specifically, the software of the service layer 102 is software for providing functions of receiving operation requests issued to the hardware resources and arbitrating the operation requests. Examples of the operation requests received by the service layer 102 may include requests for reading by the scanner, and printing by the plotter.

An interface function of the service layer 102 is provided to an application layer 201 of the operating unit 20 as well as the application layer 101 of the main body 10. In other words, the application layer 201 (application) of the operating unit 20 can also implement a function using the hardware resources (for example, the engine 17 of FIG. 1) of the main body 10 through the interface function of the service layer 102.

Software of the OS layer 103 is basic software (operating system (OS)) for providing basic functions of controlling hardware included in the main body 10. The software of the service layer 102 converts use requests of hardware resources from various kinds of applications to commands that can be interpreted by the OS layer 103, and transfers the commands to the OS layer 103. The software of the OS layer 103 executes the commands, and the hardware resources operate based on the requests from applications.

Similarly, the operating unit 20 includes the application layer 201, a service layer 202, and an OS layer 203. A hierarchical structure of the application layer 201, the service layer 202, and the OS layer 203 included in the operating unit 20 is the same as that in the main body 10. However, functions provided by applications of the application layer 201 and kinds of operation requests that can be received by the service layer 202 are different from those in the main body 10. Applications of the application layer 201 may be software for causing hardware resources included in the operating unit 20 to operate and providing a certain function, but the applications of the application layer 201 are software for mainly providing user interface (UI) functions for performing operation and display related to functions (the copy function, the scanner function, the facsimile function, and the printer function) that the main body 10 has.

In the first embodiment, the software of the OS layer 103 on the main body 10 is different from the software of the OS layer 203 on the operating unit 20 in order to maintain independency of functions. In other words, the main body 10 and the operating unit 20 operate independently of one another on different OSes. For example, Linux (registered trademark) can be used as the software of the OS layer 103 on the main body 10, and Android (registered trademark) can be used as the software of the OS layer 203 on the operating unit 20.

Because the main body 10 and the operating unit 20 in the information processing apparatus 100 according to the first embodiment operate on different OSes as described above, communication between the main body 10 and the operating unit 20 is performed not as interprocess communication in a common apparatus but as communication between different apparatuses. Examples of the communication between different apparatuses include the operation (command communication) of the operating unit 20 transmitting received information (instruction contents from a user) to the main body 10 and the operation of the main body 10 notifying the operating unit 20 of events. The operating unit 20 performs command communication to the main body 10 so as to use functions of the main body 10. Examples of the events notified from the main body 10 to the operating unit 20 include an execution situation of the operation in the main body 10 and information defined by the main body 10.

In the first embodiment, power is supplied from the main body 10 to the operating unit 20 through the communication path 40, but power supply control of the operating unit 20 may be performed separately from (independently of) power supply control of the main body 10.

In the first embodiment, the main body 10 and the operating unit 20 operate independently of one another on different OSes, but it is not limited thereto. For example, the main body 10 and the operating unit 20 may operate on the same OS.

FIG. 3 is a diagram illustrating an example of a functional block configuration of the operating unit 20 according to the first embodiment relating to recognition of a peripheral apparatus. The functional block of the operating unit 20 according to the first embodiment relating to recognition of a peripheral apparatus includes a functional block that belongs to the application layer 101, a functional block that belongs to the OS layer 103, and a storage unit 111.

The functional block of the application layer 101 includes an updating unit 113, a first application 117, and a second application 118. The functional block of the OS layer 103 includes a detecting unit 114, a first recognizing unit 115, and a second recognizing unit 116. The storage unit 111 is implemented by the ROM 22, the RAM 23, and the flash memory 24. The storage unit 111 stores therein peripheral apparatus information 112. Here, the peripheral apparatus information 112 will be described.

FIG. 4 is a diagram illustrating an example of the peripheral apparatus information 112 according to the first embodiment. The peripheral apparatus information 112 according to the first embodiment includes a vendor identification (ID), and a product ID. The vendor ID and the product ID are information for identifying a peripheral apparatus. The example of FIG. 4 illustrates an example of a case where the first recognizing unit 115 recognizes a peripheral apparatus having a vendor ID of 0123 and a product ID of 4567, a peripheral apparatus having a vendor ID of 2345 and a product ID of 6789, and a peripheral apparatus having a vendor ID of 1234 and a product ID of 5678.

The vendor ID is information for identifying a manufacturer of a peripheral apparatus. The product ID is information for identifying a peripheral apparatus (product). In other words, the example of FIG. 4 illustrates an example of identification information about a case where a connection standard of peripheral apparatuses is, for example, a USB connection standard. At least one of the vendor ID and the product ID may be used as the identification information about a peripheral apparatus. The first embodiment describes a case where the identification information about a peripheral apparatus corresponds to the vendor ID and the product ID. The peripheral apparatus information 112 is updated by the updating unit 113, and is read (referred to) by the first recognizing unit 115 and the second recognizing unit 116.

Referring back to FIG. 3, when receiving an update request from the first application 117 or the second application 118, the updating unit 113 updates the identification information (the vendor ID and the product ID) included in the peripheral apparatus information 112. The update request is an addition request or a deletion request. The addition request is a request for adding the identification information (the vendor ID and the product ID) to the peripheral apparatus information 112. The deletion request is a request for deleting the identification information (the vendor ID and the product ID) from the peripheral apparatus information 112. The following describes an example of updating the peripheral apparatus information 112, as an example of a case where the updating unit 113 receives an addition request from the first application 117 or the second application 118.

FIG. 5 is a diagram illustrating an example of updating the peripheral apparatus information 112 according to the first embodiment (case of an addition request). The example of FIG. 5 illustrates an example of a case where the updating unit 113 receives an addition request indicating addition of a vendor ID (3456) and a product ID (7890) from the first application 117 or the second application 118 when the peripheral apparatus information 112 is in a state of FIG. 4.

Referring back to FIG. 3, when detecting the peripheral apparatus 29 connected to the external connection I/F 28, the detecting unit 114 notifies the first recognizing unit 115 and the second recognizing unit 116 of the detection of the peripheral apparatus 29. At this time, the detecting unit 114 acquires the identification information (the vendor ID and the product ID) of the peripheral apparatus 29 connected to the external connection I/F 28, and notifies the first recognizing unit 115 and the second recognizing unit 116 of the identification information. The notification of the identification information may be made at the same time when the first recognizing unit 115 or the second recognizing unit 116 is notified of the detection of the peripheral apparatus 29, or may be made when an acquisition request of the identification information is received from the first recognizing unit 115 or the second recognizing unit 116.

When receiving a notification that indicates the detection of the peripheral apparatus 29 from the detecting unit 114, the first recognizing unit 115 reads the peripheral apparatus information 112 from the storage unit 111. If the identification information (the vendor ID and the product ID) about the peripheral apparatus 29 connected to the external connection I/F 28 is included in the peripheral apparatus information 112, the first recognizing unit 115 recognizes the peripheral apparatus 29 as a first peripheral apparatus. Examples of the first peripheral apparatus include information reading devices such as an IC card reader. When recognizing the peripheral apparatus 29 connected to the external connection I/F 28 as the first peripheral apparatus, the first recognizing unit 115 notifies the first application 117 of the recognition of the first peripheral apparatus.

When receiving a notification that indicates the detection of the peripheral apparatus 29 from the detecting unit 114, the second recognizing unit 116 reads the peripheral apparatus information 112 from the storage unit 111. If the identification information (the vendor ID and the product ID) about the peripheral apparatus 29 connected to the external connection I/F 28 is not included in the peripheral apparatus information 112, the second recognizing unit 116 recognizes the peripheral apparatus 29 as a second peripheral apparatus. Examples of the second peripheral apparatus include a keyboard. When recognizing the peripheral apparatus 29 connected to the external connection I/F 28 as the second peripheral apparatus, the second recognizing unit 116 notifies the second application 118 of the recognition of the second peripheral apparatus.

The first application 117 is an application that uses the first peripheral apparatus. The first application 117 transmits an addition request of the identification information (the vendor ID and the product ID) about the peripheral apparatus 29 to be recognized as the first peripheral apparatus (peripheral apparatus 29 not to be recognized as the second peripheral apparatus) to the updating unit 113. The first application 117 transmits a deletion request of the identification information (the vendor ID and the product ID) about the peripheral apparatus 29 not to be recognized as the first peripheral apparatus (peripheral apparatus 29 to be recognized as the second peripheral apparatus) to the updating unit 113. When the first recognizing unit 115 recognizes the first peripheral apparatus, the first application 117 receives a notification that indicates the recognition of the first peripheral apparatus from the first recognizing unit 115.

The second application 118 is an application that uses the second peripheral apparatus. The second application 118 transmits a deletion request of the identification information (the vendor ID and the product ID) about the peripheral apparatus 29 to be recognized as the second peripheral apparatus (peripheral apparatus 29 not to be recognized as the first peripheral apparatus) to the updating unit 113. The second application 118 transmits an addition request of the identification information (the vendor ID and the product ID) about the peripheral apparatus 29 not to be recognized as the second peripheral apparatus (peripheral apparatus 29 to be recognized as the first peripheral apparatus) to the updating unit 113. When the second recognizing unit 116 recognizes the second peripheral apparatus, the second application 118 receives a notification that indicates the recognition of the second peripheral apparatus from the second recognizing unit 116.

When causing the peripheral apparatus 29 to be recognized as the first peripheral apparatus or the second peripheral apparatus by the operating unit 20, only either one of the first application 117 and the second application 118 has to transmit an update request (an addition request or a deletion request). The timing of the first peripheral apparatus or the second peripheral apparatus transmitting an update request can be arbitrary. The transmitting timing of the update request is, for example, a time when the first application 117 or the second application 118 starts. For the peripheral apparatus 29 desired to be always recognized as the first peripheral apparatus or the second peripheral apparatus even when the first application 117 or the second application 118 does not start, for example, fixed peripheral apparatus information may be further stored in the storage unit 111.

The fixed peripheral apparatus information is the peripheral apparatus information 112 that includes predetermined and non-updatable identification information (the vendor ID and the product ID). For the identification information stored in the storage unit 111 as the fixed peripheral apparatus information, the first application 117 or the second application 118 does not need to transmit an update request (an addition request or a deletion request) of the identification information to the updating unit 113. A processing time for recognizing the peripheral apparatus 29 can be reduced by storing the fixed peripheral apparatus information with a small amount of data in the ROM 22 having a higher access speed than the flash memory 24 and storing the peripheral apparatus information 112 in the flash memory 24. Specifically, the first recognizing unit 115 reads the fixed peripheral apparatus information stored in the ROM 22 before the peripheral apparatus information 112 stored in the flash memory 24 so that a recognition processing time of the first recognizing unit 115 can be reduced.

In FIG. 3, the first recognizing unit 115 corresponds to the first application 117 one on one, but a plurality of applications may use the first peripheral apparatus. Similarly, the second recognizing unit 116 corresponds to the second application 118 one on one, but a plurality of applications may use the second peripheral apparatus.

The following describes the information processing method according to the first embodiment.

FIG. 6 is a sequence diagram illustrating an example of a method for updating the peripheral apparatus information 112 according to the first embodiment. The example of FIG. 6 illustrates an example of a case where the first application 117 transmits an update request (an addition request or a deletion request) of the peripheral apparatus information 112 to the updating unit 113.

The first application 117 transmits an addition request of the identification information (the vendor ID and the product ID) to the updating unit 113 (Step S1). The updating unit 113 adds the identification information included in the addition request to the peripheral apparatus information 112 in the storage unit 111 (Step S2). Herewith, when the peripheral apparatus 29 that is identified by the identification information added at Step S2 is connected to the external connection I/F 28, the peripheral apparatus 29 is recognized as the first peripheral apparatus by the first recognizing unit 115 in the processing after Step S2.

The first application 117 transmits a deletion request of the identification information (the vendor ID and the product ID) to the updating unit 113 (Step S3). The updating unit 113 deletes the identification information included in the deletion request from the peripheral apparatus information 112 in the storage unit 111 (Step S4). Herewith, when the peripheral apparatus 29 that is identified by the identification information deleted at Step S4 is connected to the external connection I/F 28, the peripheral apparatus 29 is recognized as the second peripheral apparatus by the second recognizing unit 116 in the processing after Step S4.

FIG. 7 is a sequence diagram illustrating an example of a method for recognizing the peripheral apparatus 29 according to the first embodiment.

The detecting unit 114 detects the peripheral apparatus 29 connected to the external connection I/F 28 (Step S11). The detecting unit 114 notifies the first recognizing unit 115 of the detection of the peripheral apparatus 29 (Step S12). The first recognizing unit 115 transmits an acquisition request of the identification information (the vendor ID and the product ID) to the detecting unit 114, and receives the identification information from the detecting unit 114 (Step S13). The first recognizing unit 115 reads the peripheral apparatus information 112 in the storage unit 111 (Step S14). If the identification information about the peripheral apparatus 29 connected to the external connection I/F 28 is included in the peripheral apparatus information 112, the first recognizing unit 115 recognizes the peripheral apparatus 29 as the first peripheral apparatus, and notifies the first application 117 of the recognition of the first peripheral apparatus (Step S15).

Subsequently, the detecting unit 114 notifies the second recognizing unit 116 of the detection of the peripheral apparatus 29 (Step S16). The second recognizing unit 116 transmits an acquisition request of the identification information (the vendor ID and the product ID) to the detecting unit 114, and receives the identification information from the detecting unit 114 (Step S17). The second recognizing unit 116 reads the peripheral apparatus information 112 in the storage unit 111 (Step S18). If the identification information about the peripheral apparatus 29 connected to the external connection I/F 28 is not included in the peripheral apparatus information 112, the second recognizing unit 116 recognizes the peripheral apparatus 29 as the second peripheral apparatus, and notifies the second application 118 of the recognition of the second peripheral apparatus (Step S19).

As described above, in the information processing apparatus 100 according to the first embodiment, when the peripheral apparatus 29 is connected to the operating unit 20, the first recognizing unit 115 recognizes, if the identification information (for example, the vendor ID and the product ID) about the connected peripheral apparatus 29 is included in the peripheral apparatus information 112, the connected peripheral apparatus 29 as the first peripheral apparatus. If not, the second recognizing unit 116 recognizes the connected peripheral apparatus 29 as the second peripheral apparatus. Herewith, the information processing apparatus 100 according to the first embodiment can more appropriately recognize a kind of the peripheral apparatus 29 connected to the information processing apparatus 100 (operating unit 20).

The computer program executed by the information processing apparatus 100 (the CPU 11 in the main body 10 or the CPU 21 in the operating unit 20) according to the first embodiment is a file in an installable format or in an executable format, and is recorded in computer-readable storage media such as a compact disk read only memory (CD-ROM), a memory card, a compact disk recordable (CD-R), and a digital versatile disk (DVD) so as to be provided as a computer program product.

The computer program executed by the information processing apparatus 100 according to the first embodiment may be stored in a computer connected to the network 200 such as the Internet and be downloaded via the network 200 so as to be provided. The computer program executed by the information processing apparatus 100 according to the first embodiment may be provided via the network 200 such as the Internet without being downloaded.

The computer program executed by the CPU 11 in the main body 10 according to the first embodiment may be preliminarily stored in the ROM 12, the HDD 14, or the like so as to be provided. Similarly, the computer program executed by the CPU 21 in the operating unit 20 according to the first embodiment may be preliminarily stored in the ROM 22, the flash memory 24, or the like so as to be provided.

The computer program executed by the CPU 21 in the operating unit 20 according to the first embodiment has a module configuration that includes each of the functional blocks (the updating unit 113, the detecting unit 114, the first recognizing unit 115, and the second recognizing unit 116) in FIG. 3. As actual hardware, the CPU 21 loads and executes the computer program in the ROM 22, the flash memory 24, the storage media, or the like so as to implement the functional blocks. A part of or all of the functional blocks in FIG. 3 may be implemented not by software but by hardware, and may be implemented by combination of software and hardware.

The first embodiment describes a case where the information processing apparatus 100 is an MFP. However, the information processing apparatus 100 may be a system that includes any operating unit 20 capable of recognizing the peripheral apparatus 29 and any electronic apparatus.

Second Embodiment

The following describes a second embodiment. The information processing apparatus 100 according to the second embodiment is different from the information processing apparatus 100 according to the first embodiment in that the operating unit 20 further includes a registering unit 119. In the second embodiment, the same explanation as that of the first embodiment is omitted, and parts different from the first embodiment are described.

Explanation of a hardware configuration of the information processing apparatus 100 according to the second embodiment is omitted because the explanation is the same as that of the hardware configuration of the information processing apparatus 100 according to the first embodiment (see FIG. 1). Explanation of a software configuration of the information processing apparatus 100 according to the second embodiment is omitted because the explanation is the same as that of the software configuration of the information processing apparatus 100 according to the first embodiment (see FIG. 2).

FIG. 8 is a diagram illustrating an example of a functional block configuration of the operating unit 20 according to the second embodiment relating to recognition of the peripheral apparatus. The functional block of the operating unit 20 according to the second embodiment relating to recognition of the peripheral apparatus includes a functional block that belongs to the application layer 101, a functional block that belongs to the OS layer 103, and the storage unit 111.

The functional block of the application layer 101 includes the updating unit 113, the first application 117, the second application 118, and the registering unit 119. Explanation of the updating unit 113, the first application 117, and the second application 118 according to the second embodiment is omitted because the explanation is the same as that of the updating unit 113, the first application 117, and the second application 118 according to the first embodiment.

The registering unit 119 registers the identification information about the peripheral apparatus 29 recognized as the second peripheral apparatus in the peripheral apparatus information 112 as the first peripheral apparatus. Herewith, the peripheral apparatus 29 can be recognized as the first peripheral apparatus by the first recognizing unit 115 at the time of remounting the peripheral apparatus 29.

Specifically, the registering unit 119 displays a registration change screen on an operation panel of the user I/F 27 or the like according to, for example, operation input by a user through an input apparatus of the user I/F 27 or the like. The registration change screen is a screen on which the peripheral apparatus 29 already connected to the external connection I/F 28 and recognized as the second peripheral apparatus is registered as the first peripheral apparatus. The registering unit 119 registers the identification information about the peripheral apparatus 29 already recognized as the second peripheral apparatus in the peripheral apparatus information 112 as the first peripheral apparatus while the registration change screen is displayed. Herewith, the peripheral apparatus information 112 can be prevented from being updated at a timing unintended by a user.

For example, the registering unit 119 also displays a new registration screen on an operation panel of the user I/F 27 or the like according to operation input by a user through an input apparatus of the user I/F 27 or the like. The new registration screen is a screen on which the peripheral apparatus 29 newly connected to the external connection I/F 28 is registered as the first peripheral apparatus. The registering unit 119 registers the identification information about the peripheral apparatus 29 is newly recognized as the second peripheral apparatus in the peripheral apparatus information 112 as the first peripheral apparatus while the new registration screen is displayed. Herewith, the peripheral apparatus information 112 can be prevented from being updated at a timing unintended by a user. Because only the newly connected peripheral apparatus 29 can be recognized as the first peripheral apparatus, a user can update the peripheral apparatus information 112 without removing another peripheral apparatus 29 already connected to the external connection I/F 28 such as a USB port.

The registering unit 119 included in the information processing apparatus 100 according to the second embodiment can save a user that desires to register the peripheral apparatus 29 newly connected to the external connection I/F 28 or the peripheral apparatus 29 already recognized as the second peripheral apparatus as the first peripheral apparatus the trouble of checking and inputting the identification information (the vendor ID, the product ID, and/or the like) of the peripheral apparatus to the information processing apparatus 100.

The functional block of the OS layer 103 includes the detecting unit 114, the first recognizing unit 115, and the second recognizing unit 116. Explanation of the detecting unit 114, the first recognizing unit 115, and the second recognizing unit 116 according to the second embodiment is omitted because the explanation is the same as that of the detecting unit 114, the first recognizing unit 115, and the second recognizing unit 116 according to the first embodiment. The storage unit 111 is implemented by the ROM 22, the RAM 23, and the flash memory 24. The storage unit 111 stores therein the peripheral apparatus information 112. Explanation of the peripheral apparatus information 112 according to the second embodiment is omitted because the explanation is the same as that of the peripheral apparatus information 112 according to the first embodiment (see FIG. 4).

The following describes the information processing method according to the second embodiment.

FIG. 9 is a sequence diagram illustrating an example of a method for changing registration of the peripheral apparatus according to the second embodiment. The example of FIG. 9 describes a case where the second peripheral apparatus that is being connected to the external connection I/F 28 is registered as the first peripheral apparatus.

The registering unit 119 displays a registration change screen on which the first peripheral apparatus is registered on an operation panel of the user I/F 27 or the like (Step S31). The registering unit 119 displays the registration change screen according to, for example, operation input by a user through an input apparatus of the user I/F 27 or the like.

Subsequently, the registering unit 119 asks the second peripheral apparatus that is being connected to the external connection I/F 28 of the second recognizing unit 116 (Step S32). When there is the second peripheral apparatus that is being connected to the external connection I/F 28, the second recognizing unit 116 transmits the identification information for identifying the second peripheral apparatus to the registering unit 119 (Step S33).

Subsequently, the registering unit 119 transmits an update request of the peripheral apparatus information 112 for adding the identification information transmitted at Step S33 to the peripheral apparatus information 112 to the updating unit 113 (Step S34). The updating unit 113 updates the peripheral apparatus information 112 in the storage unit 111 according to the update request of the peripheral apparatus information 112 transmitted at Step S34 (Step S35). The registering unit 119 ends registration change processing of the first peripheral apparatus (Step S36).

Herewith, when the second peripheral apparatus that is identified by the identification information transmitted at Step S33 is remounted, the second peripheral apparatus becomes recognized as the first peripheral apparatus by the first recognizing unit 115. Specifically, the processing from Step S37 to Step S41 causes the second peripheral apparatus to be recognized as the first peripheral apparatus. Explanation of the processing from Step S37 to Step S41 is omitted because the explanation is the same as that of the processing from Step S11 to Step S15 in the method for recognizing the peripheral apparatus 29 according to the first embodiment (see FIG. 7).

FIG. 10 is a sequence diagram illustrating an example of a method for newly registering the peripheral apparatus according to the second embodiment. The example of FIG. 10 describes a case where the peripheral apparatus 29 newly detected as the second peripheral apparatus is detected as the first peripheral apparatus when the peripheral apparatus 29 is remounted.

The registering unit 119 displays a new registration screen on which the first peripheral apparatus is registered on an operation panel of the user I/F 27 or the like (Step S51). The registering unit 119 displays the new registration screen according to, for example, operation input by a user through an input apparatus of the user I/F 27 or the like.

Subsequently, the registering unit 119 transmits a monitoring start request of the second peripheral apparatus connected to the external connection I/F 28 to the second recognizing unit 116 (Step S52). The peripheral apparatus 29 is connected to the external connection I/F 28 (Step S53). The detecting unit 114 detects the peripheral apparatus 29 connected to the external connection I/F 28 (Step S54).

Subsequently, the second recognizing unit 116 reads the peripheral apparatus information 112 in the storage unit 111 (Step S55). Because the identification information about the peripheral apparatus 29 connected to the external connection I/F 28 at Step S53 is not included in the peripheral apparatus information 112 at Step S55, the second recognizing unit 116 notifies the registering unit 119 of the identification information about the peripheral apparatus 29 recognized as the second peripheral apparatus (Step S56). The detecting unit 114 acquires the identification information about the peripheral apparatus 29 of which the registering unit 119 is notified as the second peripheral apparatus at Step S56, from the registering unit 119 (Step S57).

Subsequently, the registering unit 119 transmits an update request of the peripheral apparatus information 112 for adding the identification information transmitted at Step S57 to the peripheral apparatus information 112 to the updating unit 113 (Step S58). The updating unit 113 updates the peripheral apparatus information 112 in the storage unit 111 according to the update request of the peripheral apparatus information 112 transmitted at Step S58 (Step S59). The registering unit 119 ends new registration processing of the first peripheral apparatus (Step S60). The registering unit 119 transmits a monitoring end request of the second peripheral apparatus connected to the external connection I/F 28 to the second recognizing unit 116 (Step S61).

Herewith, when the second peripheral apparatus that is identified by the identification information transmitted at Step S56 is remounted, the second peripheral apparatus becomes recognized as the first peripheral apparatus by the first recognizing unit 115. Specifically, the processing from Step S62 to Step S66 causes the second peripheral apparatus to be recognized as the first peripheral apparatus. Explanation of the processing from Step S62 to Step S66 is omitted because the explanation is the same as that of the processing from Step S11 to Step S15 in the method for recognizing the peripheral apparatus 29 according to the first embodiment (see FIG. 7).

As described above, the information processing apparatus 100 according to the second embodiment further includes the registering unit 119 that registers the identification information about the peripheral apparatus 29 recognized as the second peripheral apparatus in the peripheral apparatus information 112 as the first peripheral apparatus. Herewith, the information processing apparatus 100 according to the second embodiment can appropriately recognize a kind of the peripheral apparatus 29 connected to the information processing apparatus 100 (operating unit 20) with a simpler method at the time of remounting the peripheral apparatus 29.

REFERENCE SIGNS LIST

10 Main body
11 CPU
12 ROM
13 RAM
14 HDD
15 Communication I/F
16 Connection I/F
17 Engine
18 System bus
20 Operating unit
21 CPU
22 ROM
23 RAM
24 Flash memory
25 Communication I/F
26 Connection I/F
27 User I/F
28 External connection I/F
29 Peripheral apparatus
30 System bus
40 Communication path
100 Information processing apparatus
101 Application layer
102 Service layer
103 OS layer
111 Storage unit
112 Peripheral apparatus information
113 Updating unit
114 Detecting unit
115 First recognizing unit
116 Second recognizing unit
117 First application
118 Second application
119 Registering unit
200 Network
201 Application layer
202 Service layer
203 OS layer

CITATION LIST

Patent Literature

PTL 1: Japanese Laid-open Patent Publication No. 2011-104843

The invention claimed is:

1. An information processing apparatus comprising:
storage configured to store peripheral apparatus information including fixed peripheral apparatus information; and
circuitry configured to recognize a peripheral apparatus, the circuitry configured to
recognize, when a peripheral apparatus is connected to the circuitry and identification information about the connected peripheral apparatus is included in the peripheral apparatus information including the fixed peripheral apparatus information, the connected peripheral apparatus as a first peripheral apparatus; and
recognize, when a peripheral apparatus is connected to the circuitry and the identification information about the connected peripheral apparatus is not included in the peripheral apparatus information including the fixed peripheral apparatus information, the connected peripheral apparatus as a second peripheral apparatus, wherein at least one of a first application that uses the first peripheral apparatus and a second application that uses the second peripheral apparatus is configured to transmit an update request to the storage to add or delete information to or from the peripheral apparatus information when the at least one of the first application and the second application starts.

2. The information processing apparatus according to claim 1, wherein the peripheral apparatus is a peripheral apparatus conforming to a universal serial bus (USB) connection standard, and the identification information is at least either a vendor identification (ID) or a product ID.

3. The information processing apparatus according to claim 1, wherein the first peripheral apparatus is an information reading device.

4. The information processing apparatus according to claim 1, wherein the second peripheral apparatus is a keyboard.

5. The information processing apparatus according to claim 1, wherein the circuitry is further configured to register the identification information about a peripheral apparatus recognized as the second peripheral apparatus in the peripheral apparatus information as the first peripheral apparatus.

6. The information processing apparatus according to claim 5, wherein the circuitry registers, while a registration change screen on which a peripheral apparatus already connected to the circuitry and already recognized as the second peripheral apparatus is registered as the first peripheral apparatus is displayed, the identification information about the peripheral apparatus already recognized as the second peripheral apparatus in the peripheral apparatus information as the first peripheral apparatus.

7. The information processing apparatus according to claim 5, wherein the circuitry registers, while a new registration screen on which a peripheral apparatus newly connected to the circuitry is registered as the first peripheral apparatus is displayed, the identification information about the peripheral apparatus newly recognized as the second peripheral apparatus in the peripheral apparatus information as the first peripheral apparatus.

8. An information processing system comprising:
an information processing apparatus including storage configured to store peripheral apparatus information including fixed peripheral apparatus information and circuitry configured to recognize a peripheral apparatus; and
an electronic apparatus configured to perform processing according to operation received by the information processing apparatus, the circuitry configured to
recognize, when a peripheral apparatus is connected to the circuitry and identification information about the connected peripheral apparatus is included in the peripheral apparatus information including the fixed peripheral apparatus information, the connected peripheral apparatus as a first peripheral apparatus; and
recognize, when a peripheral apparatus is connected to the circuitry and the identification information about the connected peripheral apparatus is not included in the peripheral apparatus information including the fixed peripheral apparatus information, the connected peripheral apparatus as a second peripheral apparatus, wherein at least one of a first application that uses the first peripheral apparatus and a second application that uses the second peripheral apparatus is configured to transmit an update request to the storage to add or delete information to or from the peripheral apparatus information when the at least one of the first application and the second application starts.

9. An information processing method performed by an information processing apparatus that comprises storage configured to store peripheral apparatus information including fixed peripheral apparatus information and circuitry configured to recognize a peripheral apparatus, the information processing method comprising:
by the circuitry, recognizing, when a peripheral apparatus is connected to the circuitry and identification information about the connected peripheral apparatus is included in the peripheral apparatus information including the fixed peripheral apparatus information, the connected peripheral apparatus as a first peripheral apparatus, and
by the circuitry, recognizing, when a peripheral apparatus is connected to the circuitry and the identification information about the connected peripheral apparatus is not included in the peripheral apparatus information including the fixed peripheral apparatus information, the connected peripheral apparatus as a second peripheral apparatus, wherein at least one of a first application that uses the first peripheral apparatus and a second application that uses the second peripheral apparatus transmits an update request to the storage to add or delete information to or from the peripheral apparatus information when the at least one of the first application and the second application starts.

10. The information processing apparatus according to claim 1, wherein the fixed peripheral apparatus information includes predetermined and non-updatable apparatus information.

* * * * *